(12) United States Patent
Edwards, II et al.

(10) Patent No.: US 9,015,173 B2
(45) Date of Patent: Apr. 21, 2015

(54) SPOT WELD DATA MANAGEMENT AND MONITORING SYSTEM

(75) Inventors: Paul Carlos Edwards, II, Marysville, OH (US); Nathaniel Jay Hay, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 745 days.

(21) Appl. No.: 13/018,970

(22) Filed: Feb. 1, 2011

(65) Prior Publication Data

US 2012/0193330 A1 Aug. 2, 2012

(51) Int. Cl.
*G06F 17/30* (2006.01)
*B23K 11/11* (2006.01)
*B23K 11/24* (2006.01)

(52) U.S. Cl.
CPC ............... *B23K 11/11* (2013.01); *B23K 11/24* (2013.01)

(58) Field of Classification Search
None
See application file for complete search history.

(56) References Cited

U.S. PATENT DOCUMENTS

| 4,005,307 | A | 1/1977 | Tamura et al. |
| 4,302,653 | A | 11/1981 | Denning et al. |
| 4,493,965 | A | 1/1985 | Houchens et al. |
| 4,694,135 | A | 9/1987 | Nagel et al. |
| 5,399,827 | A | 3/1995 | Fortmann |
| 5,793,011 | A | 8/1998 | Watanabe et al. |
| 5,850,066 | A | 12/1998 | Dew et al. |
| 6,087,613 | A | 7/2000 | Buda et al. |
| 6,186,011 | B1 * | 2/2001 | Wung et al. ..................... 73/850 |
| RE37,799 | E | 7/2002 | Watanabe et al. |
| 6,506,997 | B2 | 1/2003 | Matsuyama |
| 6,515,251 | B1 * | 2/2003 | Wind ........................... 219/86.1 |
| 6,750,418 | B1 | 6/2004 | Nastasi, Jr. |
| 2002/0053555 | A1 * | 5/2002 | Matsuyama ................. 219/110 |
| 2007/0034611 | A1 | 2/2007 | Drius et al. |
| 2009/0016475 | A1 * | 1/2009 | Rischar et al. ............... 375/356 |
| 2010/0072176 | A1 | 3/2010 | Numano et al. |

FOREIGN PATENT DOCUMENTS

| CA | 2376464 A1 | 11/2002 |
| JP | 2006-122950 A | 5/2006 |
| JP | 2009-90316 A | 4/2009 |

* cited by examiner

*Primary Examiner* — Bai D. Vu
(74) *Attorney, Agent, or Firm* — Standley Law Group LLP

(57) ABSTRACT

A weld data management and monitoring system that supports weld data trend analysis. Weld data is collected for each weld operation and a trend index equation is applied to the data to calculate a composite number for the operation. The composite numbers for numerous welds may be plotted and analyzed to detect and evaluate weld trends over a specified period of time. In an example embodiment, the trend index equation uses the weld heat input, current, resistance, and time values to calculate the composite number. Trend data may be analyzed to identify a time when variances, whether within or outside specified tolerances, occurred. The ability to detect and analyze variances in weld operation data during a specified period of time may assist the manufacturer in identifying and resolving problems related to the weld equipment as well as other manufacturing processes or operations that may have caused variances in weld operations.

18 Claims, 22 Drawing Sheets

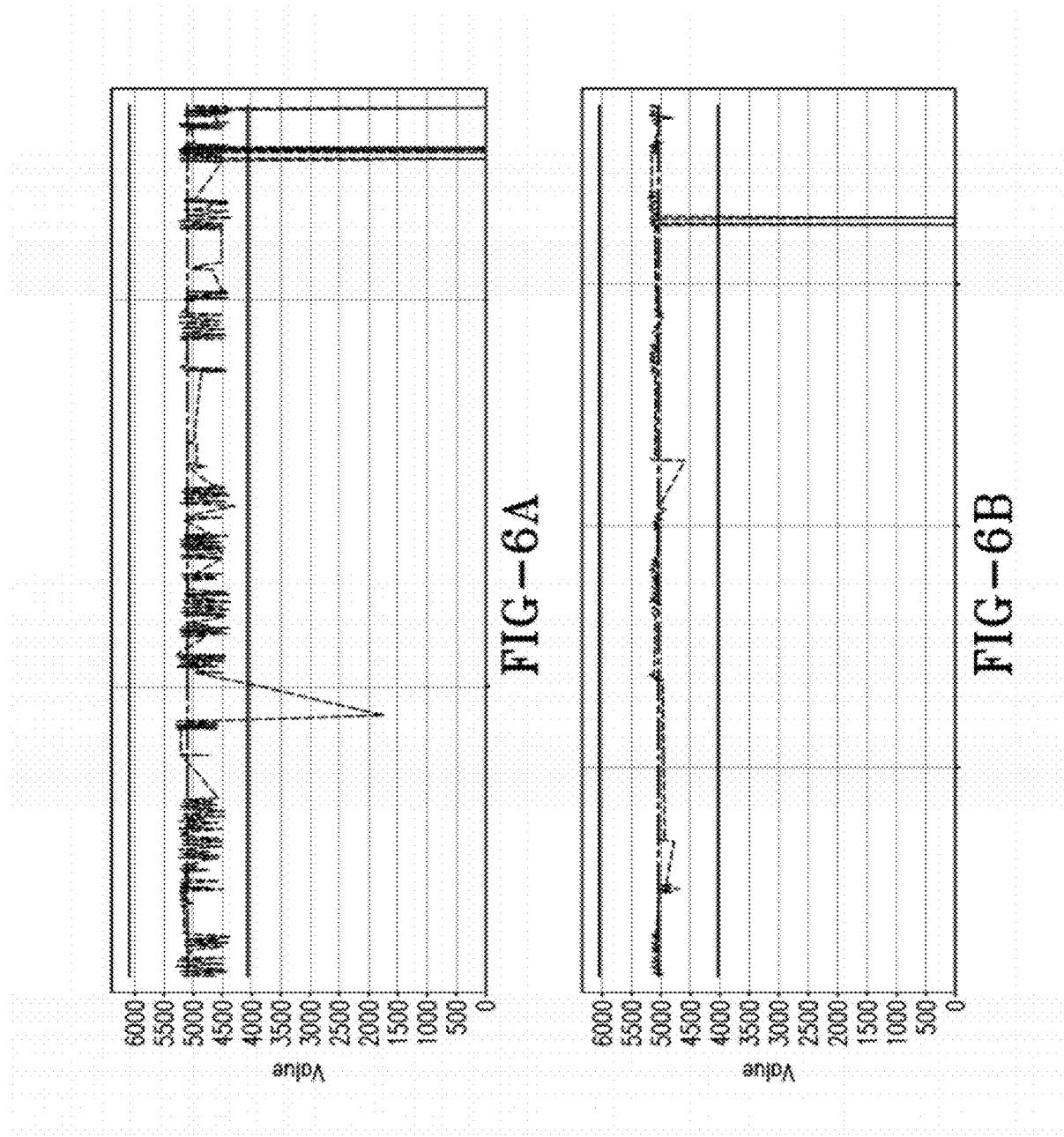

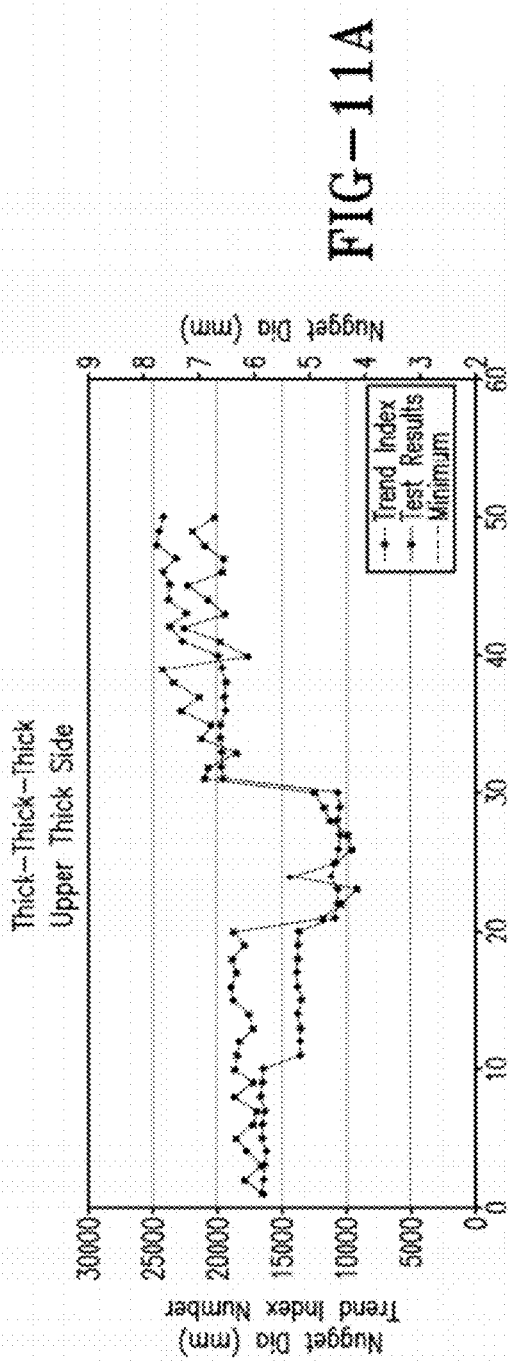
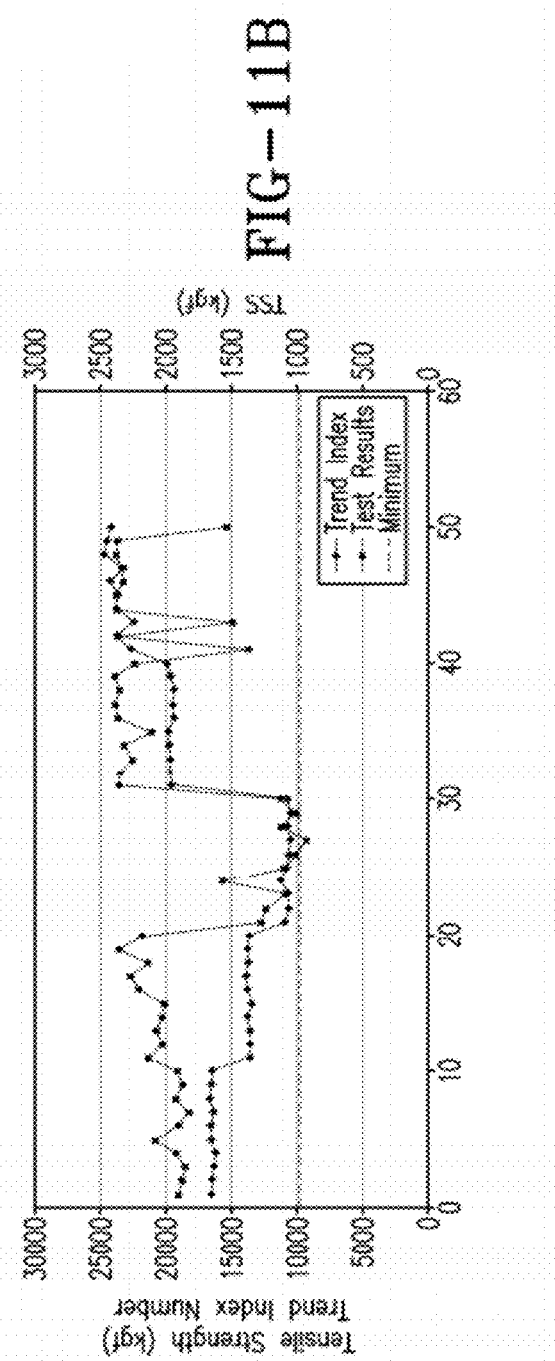
FIG-11A
FIG-11B

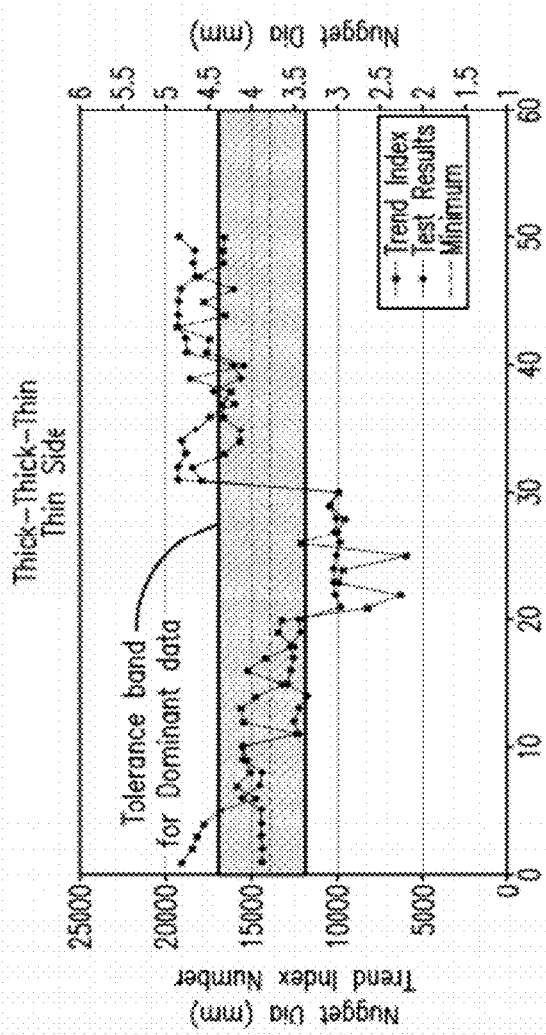
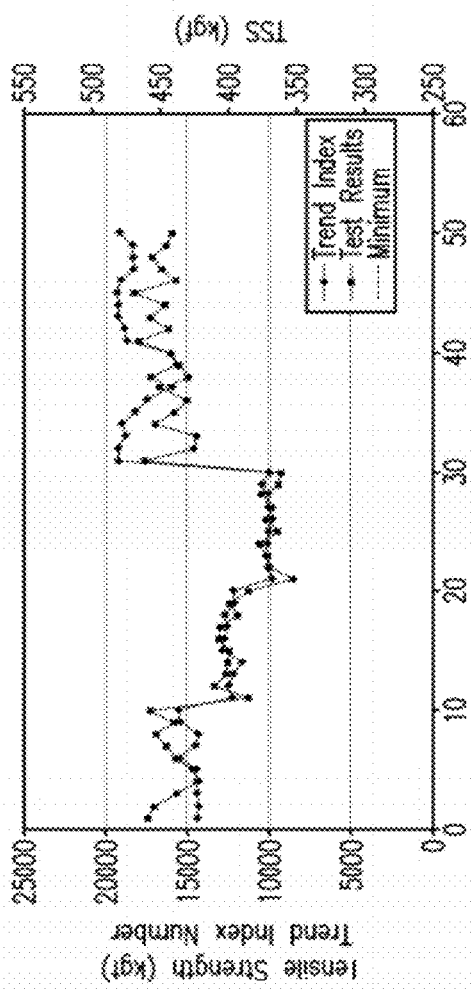
FIG-12A
FIG-12B

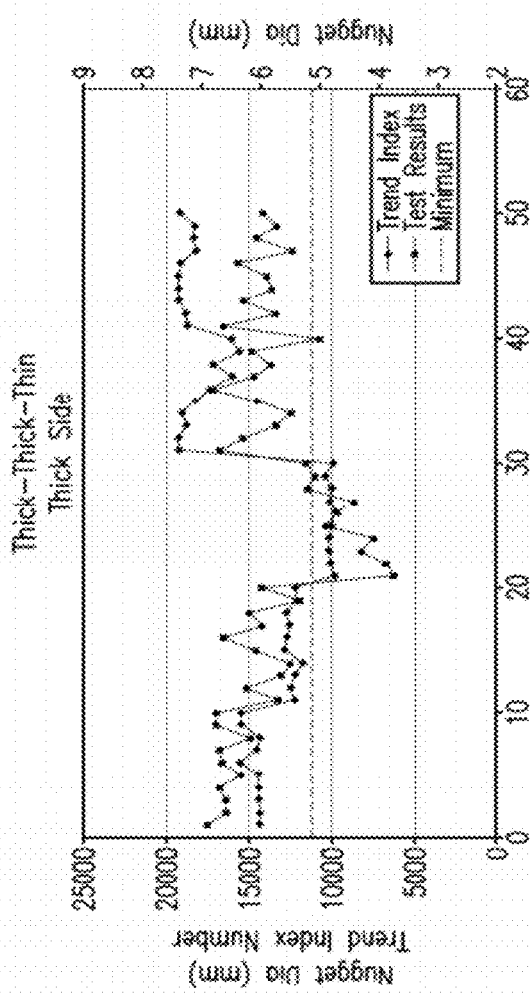
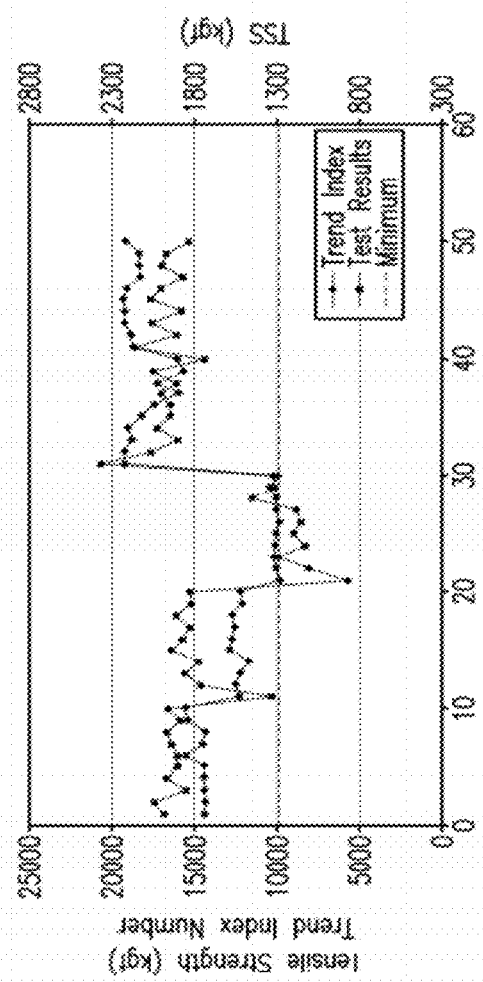
FIG-12C
FIG-12D

SPOT WELD DATA MANAGEMENT AND MONITORING SYSTEM

BACKGROUND

On automotive assembly lines, much of the assembly process involves welding operations performed by robotic welders. Welding is a critical process that impacts many parts of the automobile, including the performance of the parts in the completed vehicle. The quality of the each weld not only has an impact on consumer concerns such as alignment of the body parts, ride and noise, and longevity of the vehicle, but also has a direct impact on manufacturing cycle time, scrap, downtime, and overall costs. In a worst-case scenario, a batch of bad welds may require a manufacturer vehicle recall.

Robotic welding systems are subject to various problems that impact the quality of the weld. System parts wear out over time and in other cases, may be damaged or simply fail for a variety of reasons. As welding tips and other parts of the robotic system wear or fail, the integrity of the weld begins to diminish. To maintain the integrity and quality of the weld, most robotic welding systems have a variety of monitoring sensors that measure one or more elements of each welding operation. Data from the sensors may be collected and analyzed using a software-based monitoring and control system that provides details about the quality of each weld and the performance of the equipment. The monitoring and control system may further provide warnings about possible problems or failures and in some instances, provide feedback to control the equipment. An automotive manufacturer may also rely on periodic inspections and testing of welds to confirm the welding equipment is functioning properly. As problems are detected, robotic parts may be adjusted or replaced as needed.

Weld monitoring and control systems collect a substantial amount of data but do not always provide a convenient means for analyzing and evaluating the data that is collected. Monitoring and control systems may issue warnings or alarms when the equipment malfunctions or a specific weld parameter falls outside a specified tolerance but they do not assist the manufacturer in detecting trends, including failure trends. Furthermore, when a welding problem is detected, monitoring systems do not provide any features or functionality to assist the manufacturer in determining the scope of the problem and in identifying other parts that may have been impacted by the problem. There is a need for a weld data management and monitoring system that facilitates review and analysis of weld data trends over a period of time. There is a need for a weld data management and monitoring system that assists a manufacturer in identifying the scope and timing of weld problems and failures. Finally, there is a need for a weld data management and monitoring system that assists a manufacturer in isolating parts may have been impacted by a welding equipment or process problem.

SUMMARY

The present disclosure describes a weld data management and monitoring system that supports weld data trend analysis. Weld data is collected for each weld operation and a trend index equation is applied to the weld data to calculate a composite number for the operation. The composite numbers for numerous welds may be plotted or graphed and analyzed to detect and evaluate weld trends over a specified period of time. In an example embodiment, the trend index equation uses the weld heat input, current, resistance, and time values to calculate the composite number.

The trend index equation facilitates the identification of variances in weld operations that may be meaningful. Composite numbers that exceed an upper or lower tolerance limit may cause an alert or alarm to be issued. Trend data within specified tolerances may be analyzed to identify a time when variances, whether within or outside specified tolerances, occurred. The ability to detect and analyze variances in weld operation data during a specified period of time may assist the manufacturer in identifying and resolving not only problems related to the weld equipment but also other manufacturing processes or operations that may have caused variances in weld operations.

BRIEF DESCRIPTION OF THE DRAWINGS

FIGS. 6A and 6B are sample trend index graphs according to an example embodiment;

FIGS. 9A-9B, 10A-10B, 11A-11D, and 12A-12D are sample graphs for analyzing tolerances based on weld types according to an example embodiment.

DETAILED DESCRIPTION

Figure 1:
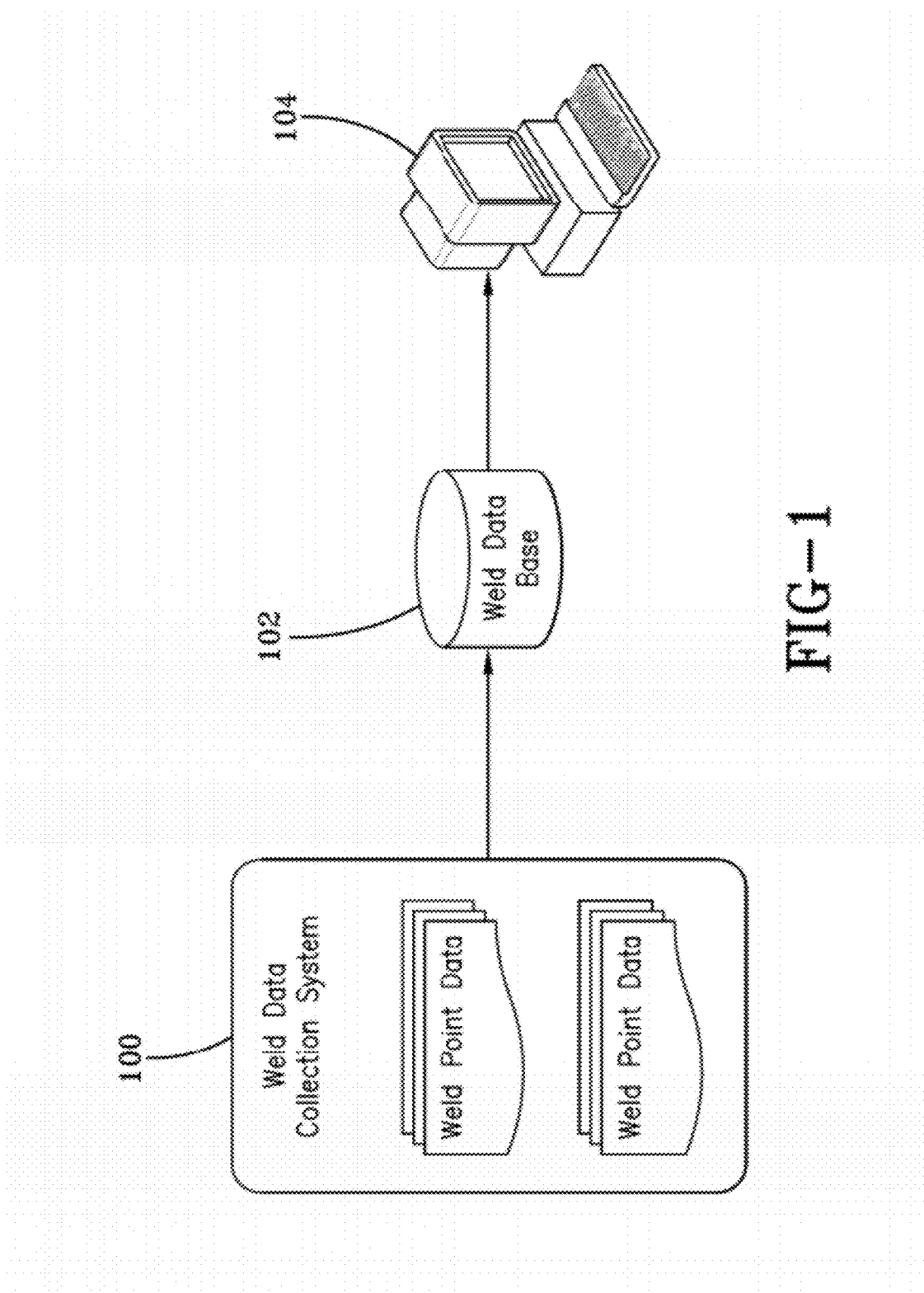
FIG. 1 is a block diagram of primary components for a spot weld data management and monitoring system according to an example embodiment.

Referring to FIG. 1, a block diagram of a weld data management and monitoring system according to an example embodiment is shown. Weld point data from one or more spot welding robots on an assembly line is collected at a weld data collection system 100. The weld point data is stored in a weld database 102 for use in a computerized weld data management and monitoring tool 104. In an example embodiment, the weld data management and monitoring system comprises a server or computer 104 executing a software application or tool that calculates the trend index value for each weld operation of each robot and provides features and functionality for viewing and analyzing the trend data. The weld database 102 may be accessible through multiple networked computers and the tool may be implemented in a variety of ways so that it is accessible to numerous computer users. For example, the tool may be implemented as a web-based application accessible from a web server.

Figure 2:
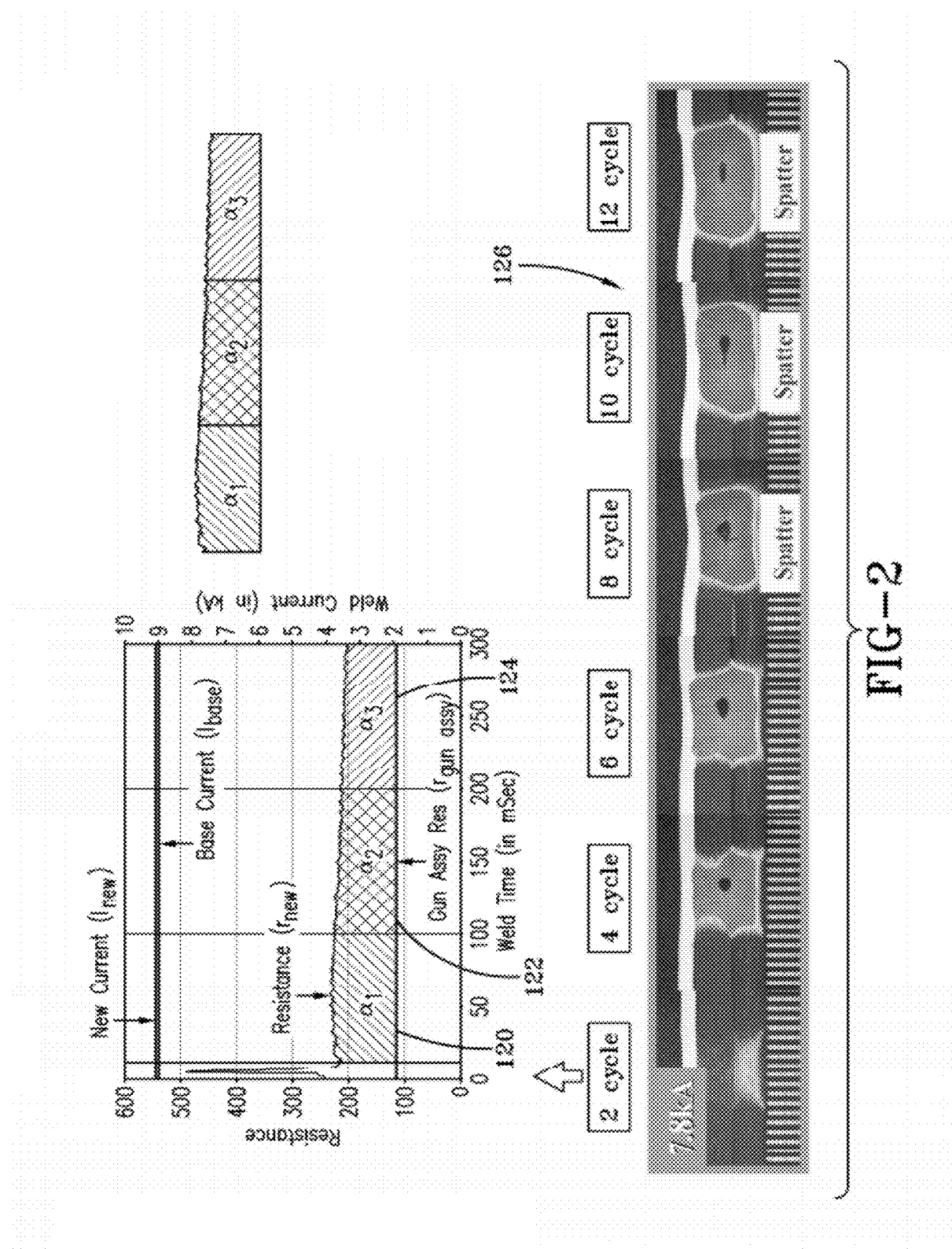
FIG. 2 is a trend index equation illustration according to an example embodiment.

Referring to FIG. 2, a trend index equation illustration according to an example embodiment is shown. In an example embodiment, inputs to the trend index equation include:

Heat Input [$HI = I^2 Rt$]

I=Current
R=resistance
t=time
The trend index equation is:

$$a_{1,2,3} * (I_{new}/I_{base})^2 * (r_{new} - r_{gun\ assy}) \qquad \text{Eq. 1}$$

The coefficients $\alpha_{1,2,3}$ may be weighted based on the stack of metals to be welded (thin/thin, thin/thick/thick, etc.) Referring to FIG. 2, each area 120, 122, 124 calculated is in a ½ cycle segment and modified based on current and a (preset variables). The results from each segment are then added together to generate a composite number. If the TI is blank, the system enters a learning routine. It uses a first base current to set the value for $I_{base}$. It then uses a programmed offset resistance, timer for the offset resistance, or gun assy resistance for $r_{gun\ assy}$. As indicated, as the weld time increases, the resistance and current values change. The snapshots in FIG. 2 126 illustrate the formation of a spot weld nugget over the robot cycle time and a type of a problem (spatter) that may occur during the weld operation.

Figure 3A:
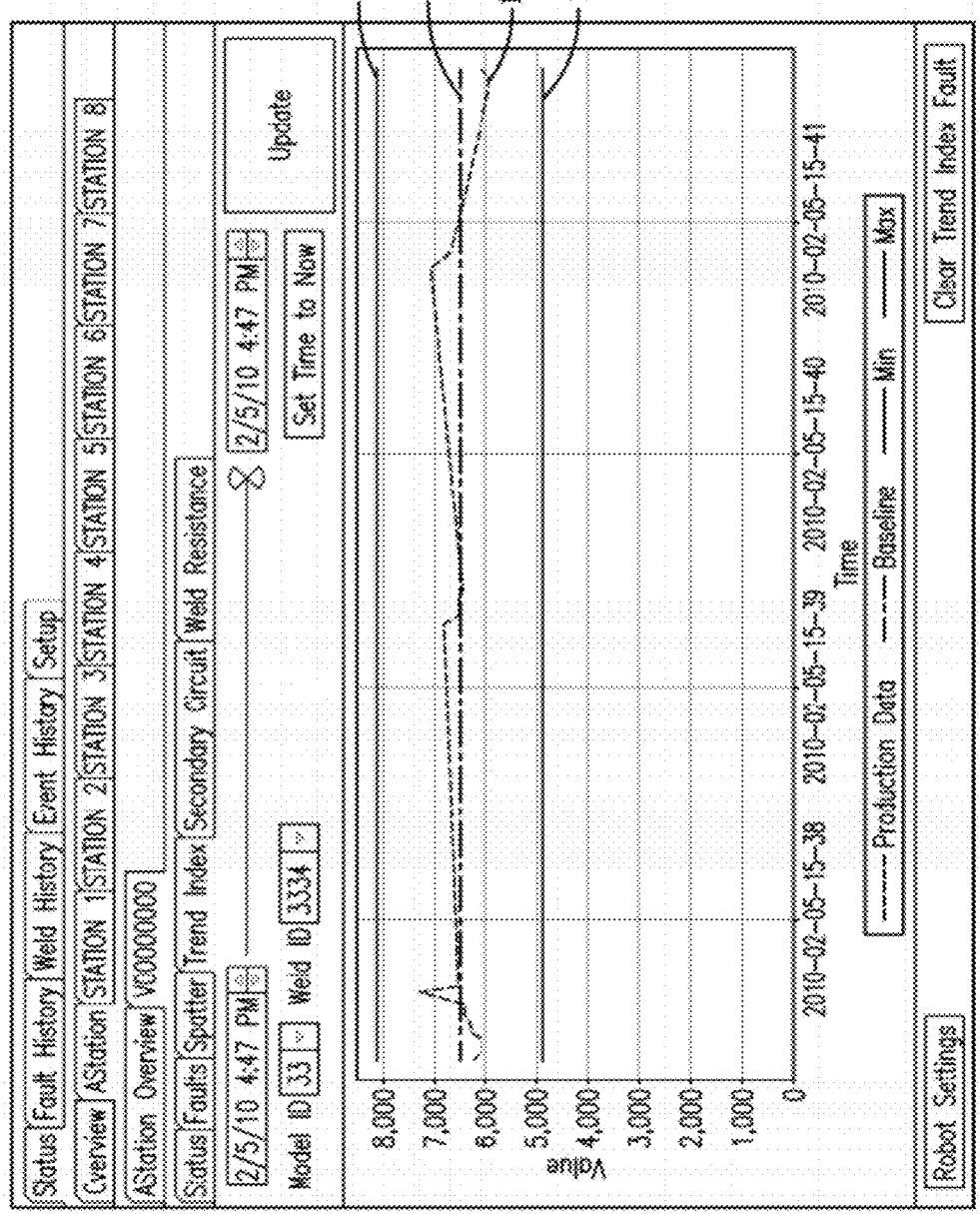
FIGS. 3A and 3B are sample trend index plot or graph screens according to an example embodiment.
Figure 3B:
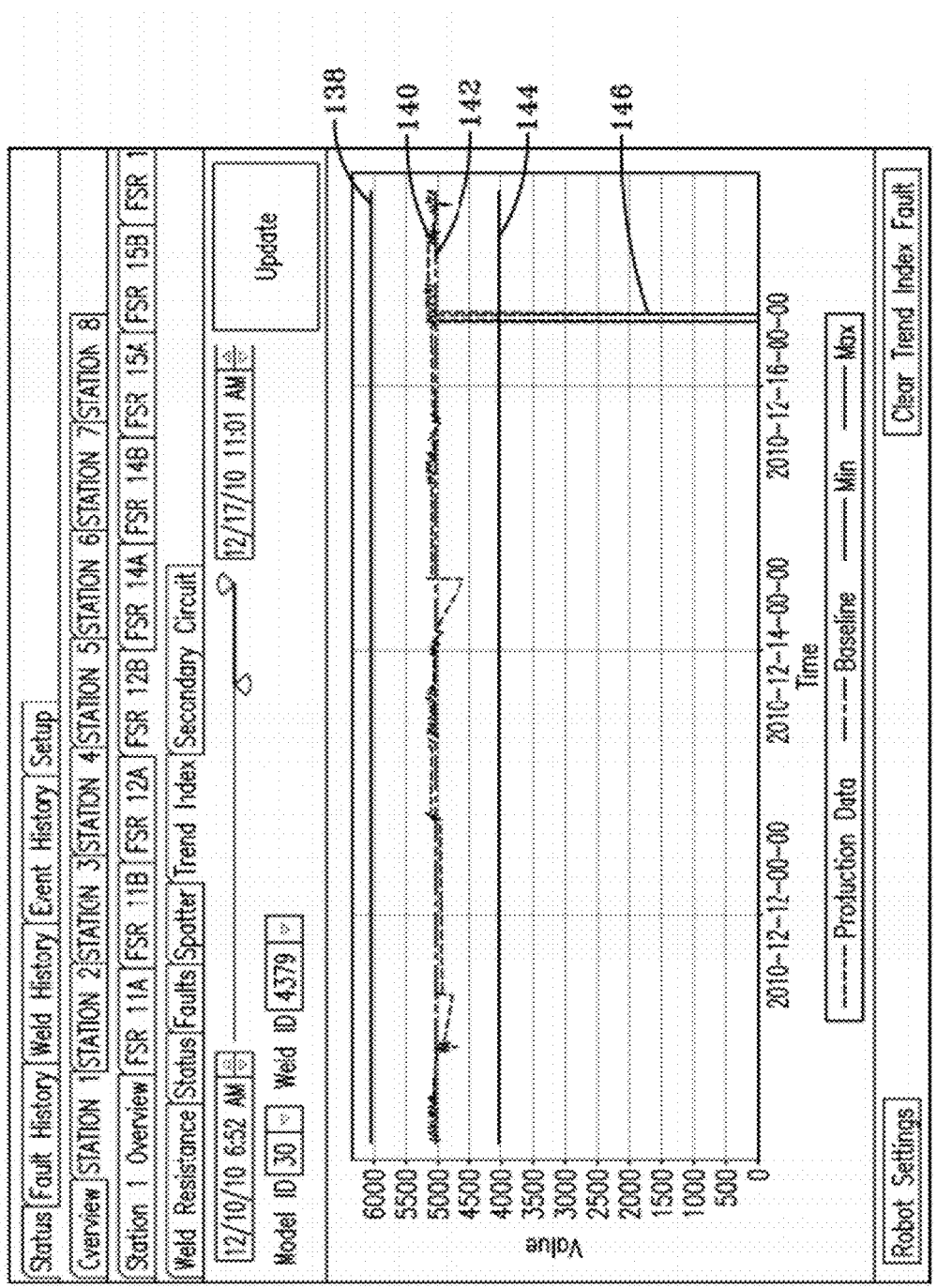

Referring to FIGS. 3A and 3B, sample trend index plot or graph screens according to an example embodiment are shown. In an example embodiment for an automotive manufacturer, a user may specify the robots for which data are displayed by specifying a model identifier and weld identifier. The user may further specify a time period. The user may modify the selection criteria and select an "update" option. In FIG. 3A, the graph comprises baseline data 132 representing target or desired trend index values over a specified period time, minimum 136 and maximum 130 trend index values, and finally, actual production trend index values 134. As illustrated in FIG. 3A, the production data 134 may vary from the target data 132 but fall within specified tolerances (minimum 136, maximum 130). The trend index shows variances in tolerance-conforming weld operations.

In FIG. 3B, the graph comprises baseline data 142 representing target or desired trend index values over a specified period time, minimum 144 and maximum 138 trend index values, and finally, actual production trend index values 140. As illustrated in FIG. 3B, a portion of the production data 146 may exceed a tolerance (e.g., minimum trend index value) indicating a problem with the welding operation at the indicated time. The problem may be attributable to the spot weld robot or another assembly process. For example, weld quality may be impacted by other assembly processes that impact sheet thickness, sheet flatness, sheet alignment, air gaps between the sheets, etc. The ability to identify not only anomalies in weld parameters but also the time at which they occurred may assist the manufacturer in determining whether other equipment, parts, or process changes are impacting the weld process.

Figure 4:
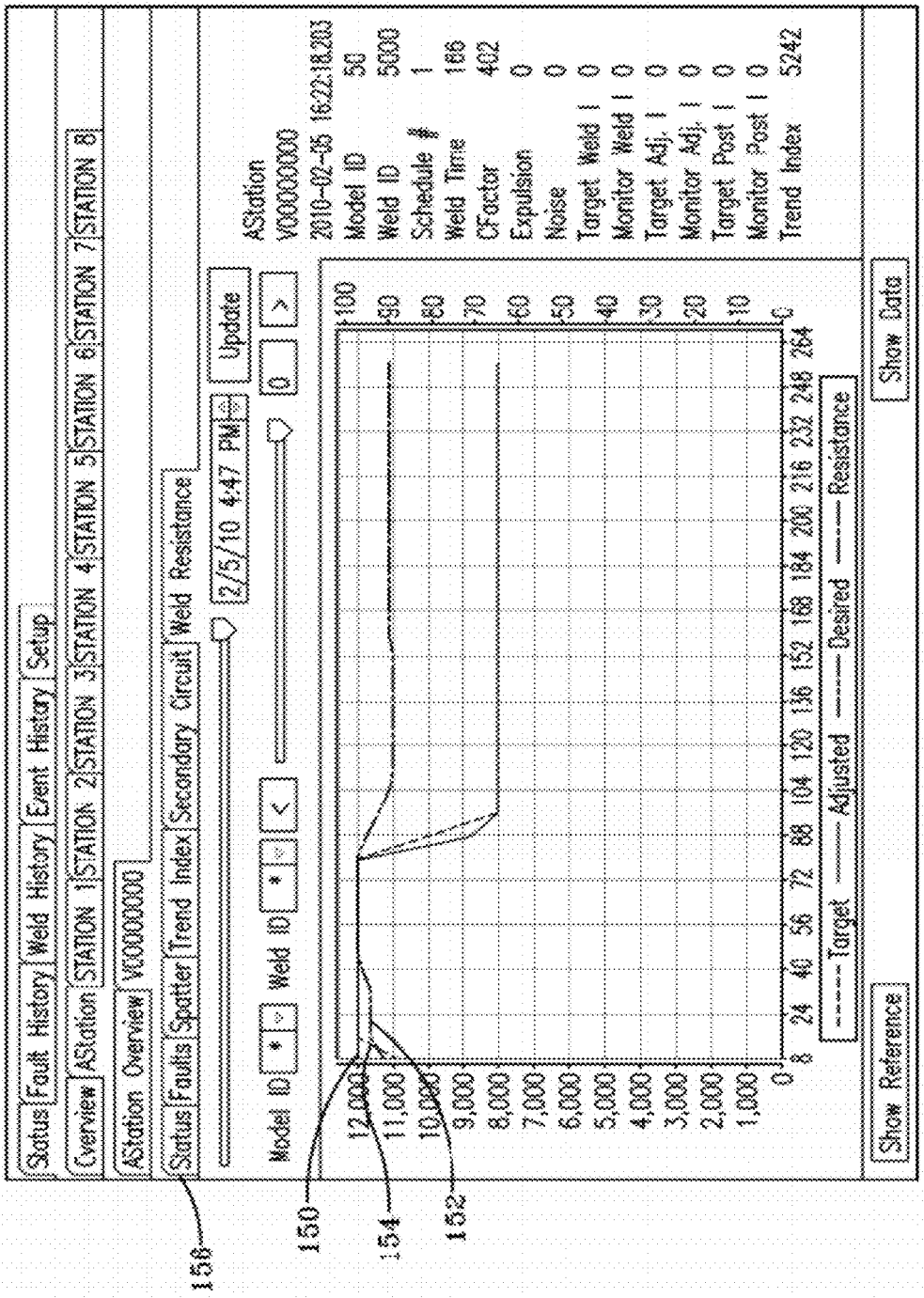
FIG. 4 is a sample weld resistance data screen according to an example embodiment.

Referring to FIG. 4, a sample weld resistance data screen according to an example embodiment is shown. Review of detailed weld data for a particular robot at a particular time may assist the manufacturer in identifying specific problems related to the welding equipment or in other assembly processes. As indicated in FIG. 4, production weld resistance data 152 may be compared against target 154 data or adjusted data 150 to determine whether an anomaly in the trend index was attributable to the resistance data. Other data such as spatter and status data 156 may be reviewed and analyzed to identify other factors that may have caused the trend index to exceed the tolerance.

Figure 5:
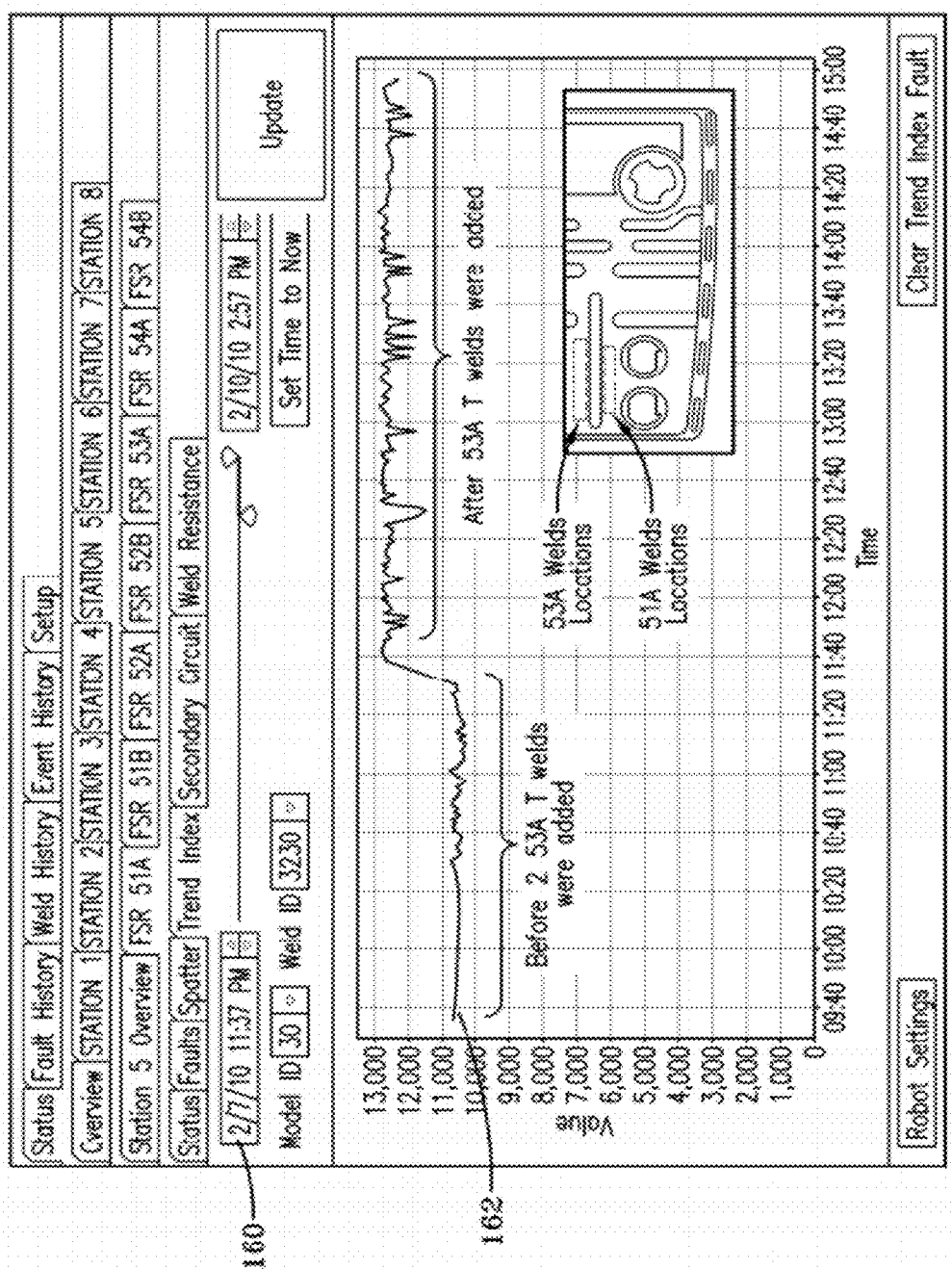
FIG. 5 is a sample trend index analysis screen according to an example embodiment.

Referring to FIG. 5, a sample trend index analysis screen according to an example embodiment is shown. In the example of FIG. 5, trend index data 162 over a specified period of several days is shown 160 is shown. As indicated in the approximately five hour portion of the data shown in FIG. 5, the trend index values are fairly consistent for the first two hours of the period. During the next three hours, the trend index values experience a substantial increase and the consistency between the values decreases. The trend index, therefore, may assist the manufacturer in identifying changes to assembly process that impact spot welding operation.

It is common in automotive manufacturing to change weld points (e.g., a weld point by robot A is moved to robot B) to enhance cycle time and/or structure. Such changes, however, may impact weld quality. The data in FIG. 5, for example, may indicate the need for a reordering of weld points (i.e., a change to the assembly process). Analysis of weld trend data assists the manufacturer in determining whether certain process or equipment changes have a negative impact on weld quality. In the example shown, new welds had been added to the work piece prior to its arrival at the specified spot weld robot. The additional welds may have altered the work piece (e.g., by introducing an air gap) in a manner that impacted the resistance/current subsequent welds.

The weld trend index may be used to identify and correct various types of problems. For example, if a problem of excessive expulsion is noted, the trend data may be used to modify the weld operation to decrease expulsion. Referring to FIG. 6A, the graph illustrates the trending of a weld point with excessive expulsion. As the graph indicates, the trend value varies substantially from point to point. (Extreme drops may be attributable to rewelding and maintenance.) The weld parameters may be modified to reduce expulsion as indicated in the results of FIG. 6B. Variability, which indicates the severity of the spatter, is reduced following modification of the weld parameters. By tracking small variations in parameters, the manufacturer may rely on fewer associates with greater skill to track and control welds and to oversee adjustments over longer time frames required for low deviation management techniques.

Figure 7A:
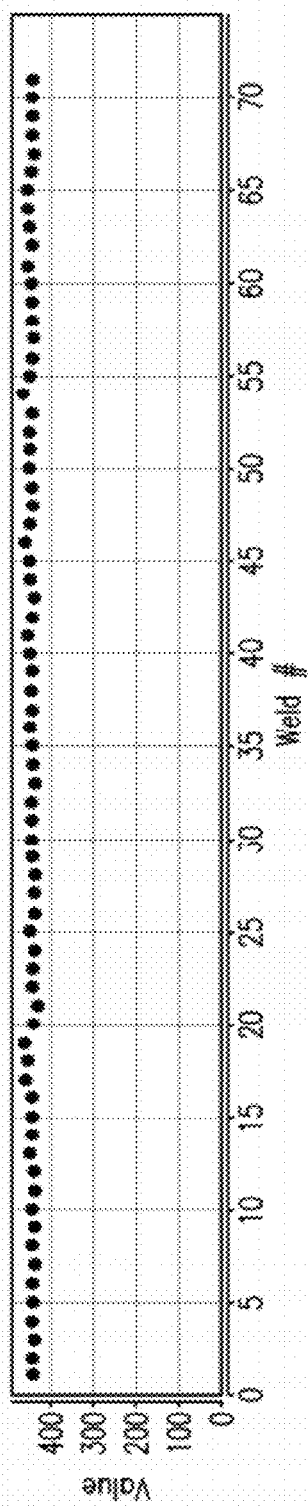
FIGS. 7A-7I are sample tip dress and secondary circuit analysis screens according to an example embodiment.
Figure 7B:
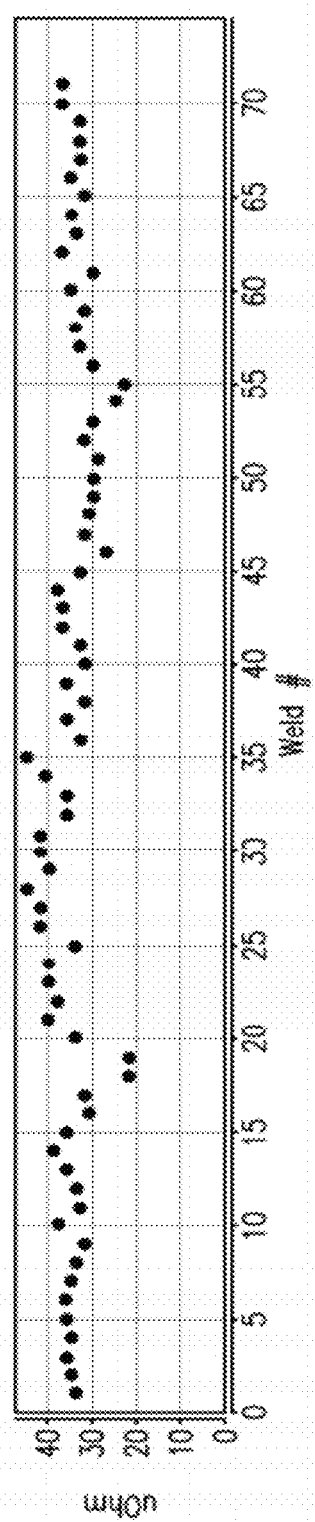
Figure 7C:
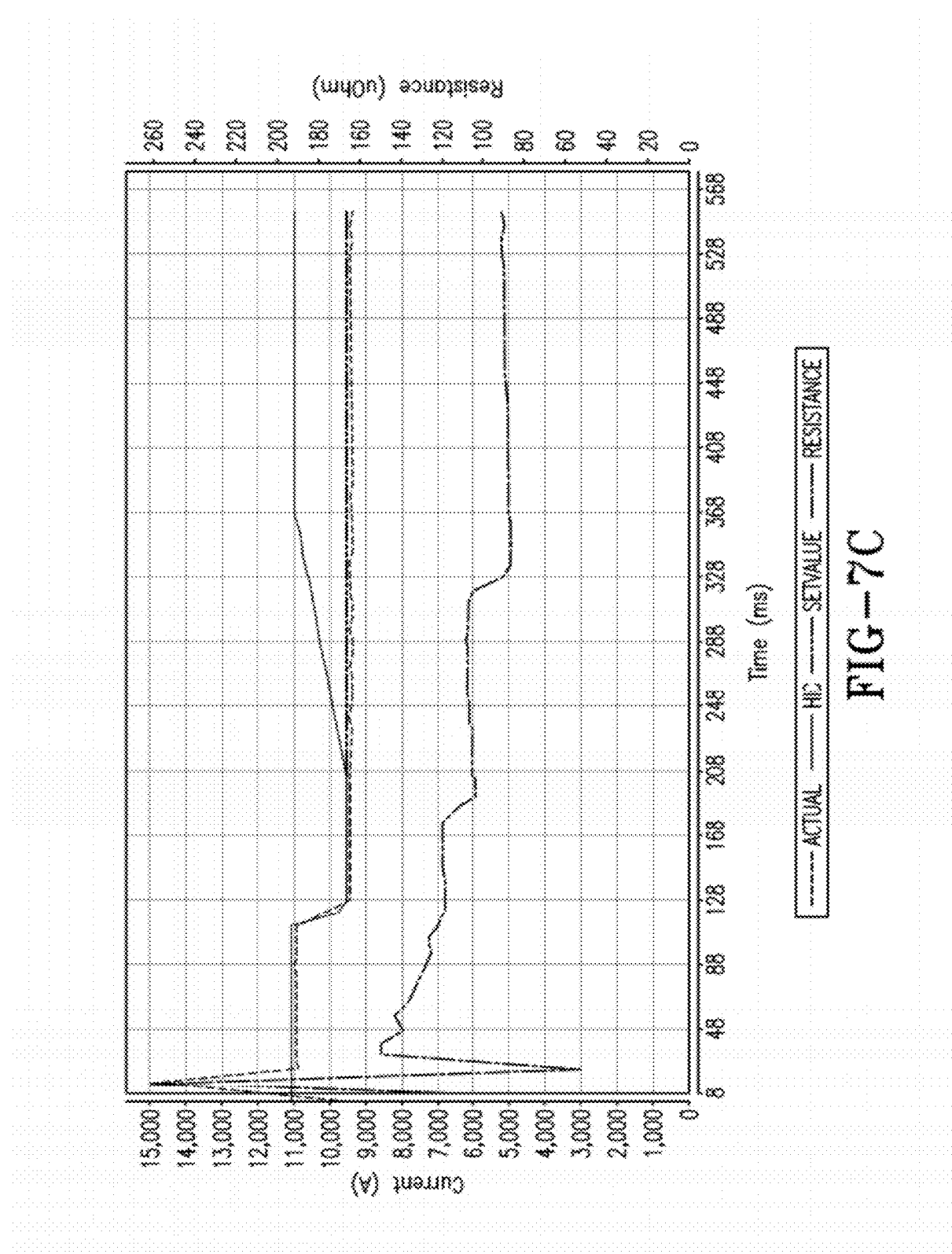
Figure 7D:
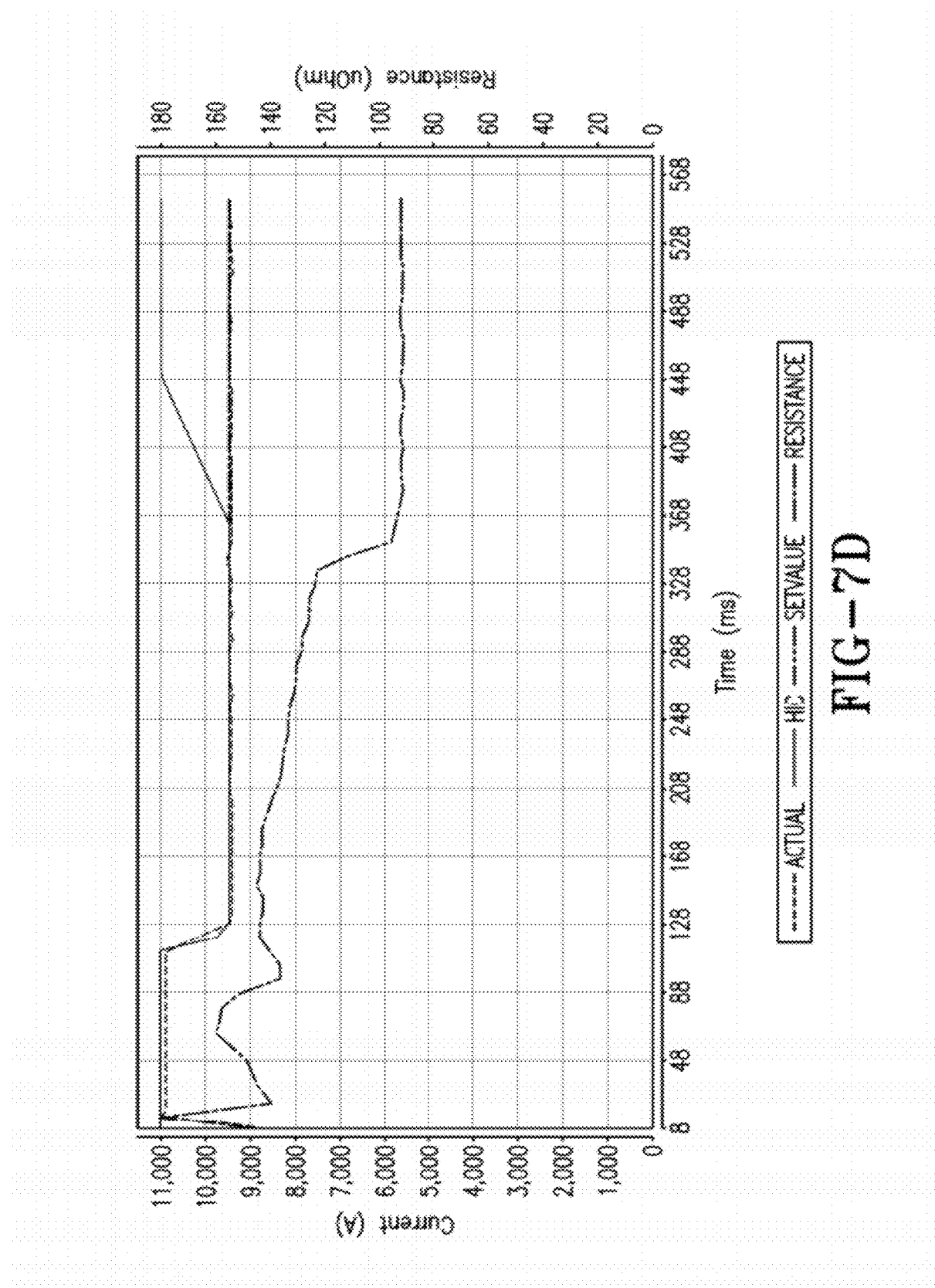
Figure 7E:
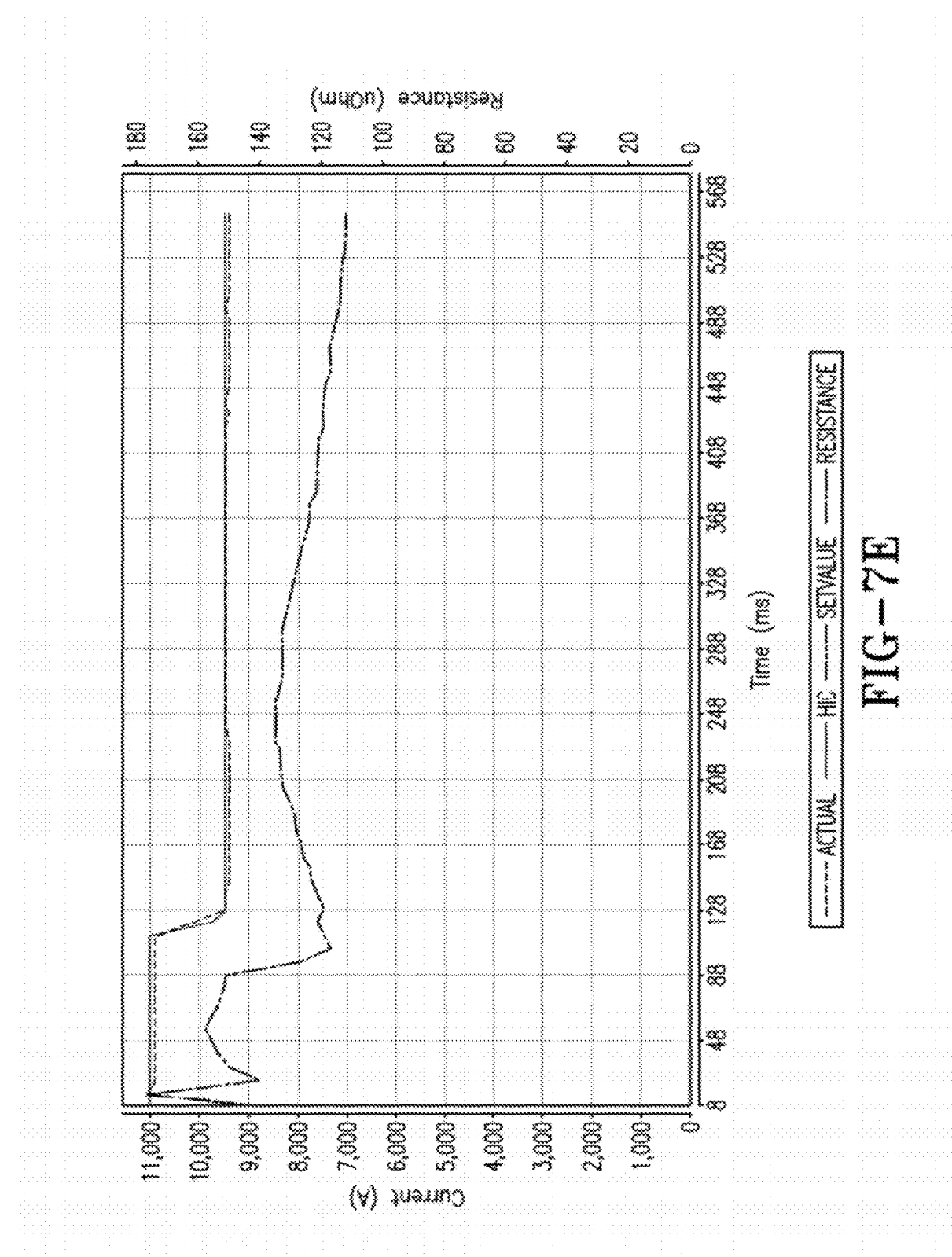
Figure 7F:
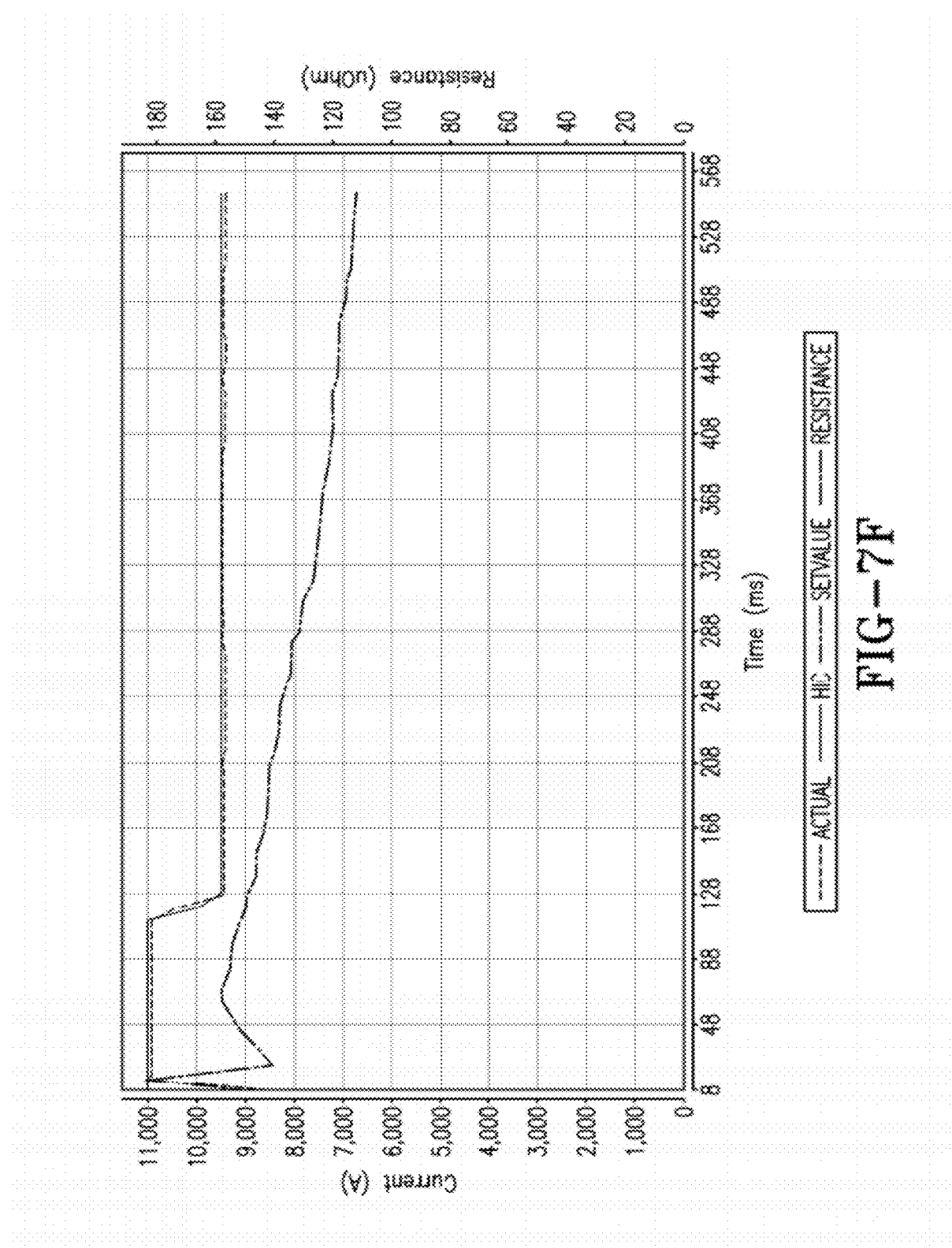
Figure 7G:
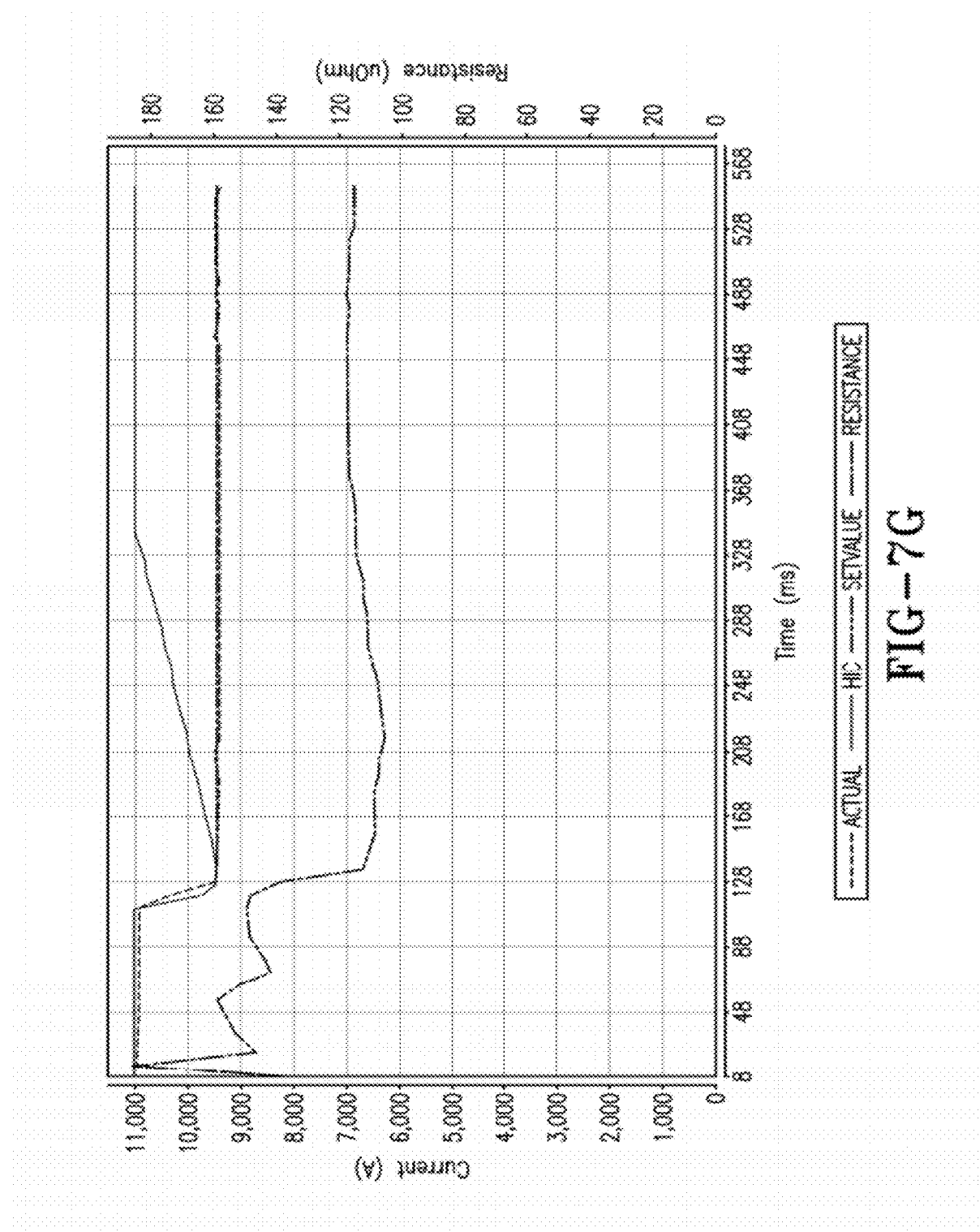
Figure 7I:
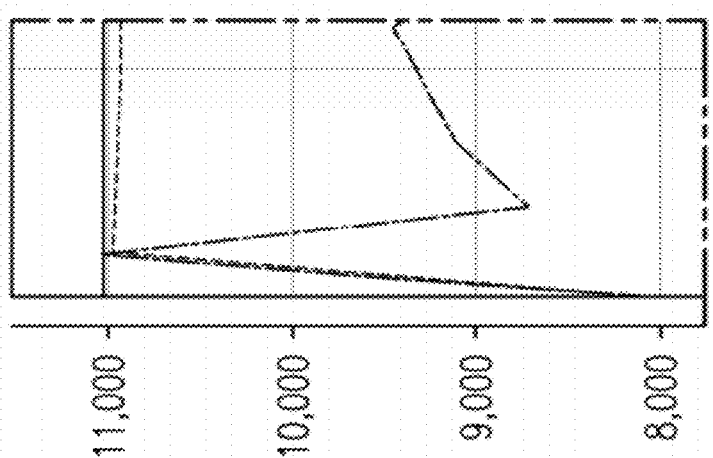
Figure 7H:
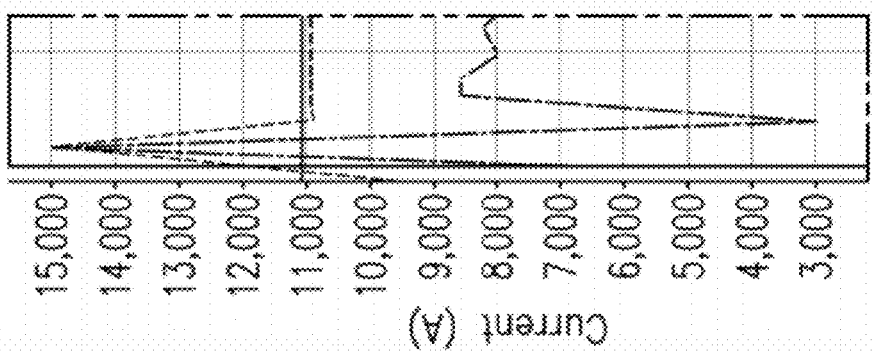

"Cold welds" are another problem that may be corrected using trend index data. Cold welds involve two or three sheet plate combinations in which one or more of the interfaces have no significant weld. Trend index data may be analyzed to isolate cold welds and determine if other welds were stable before and after the cold weld. A spike in the trend index data, similar to a spike that may be present in an excessive expulsion, assists an associate in diagnosing possible causes. Referring to FIGS. 7A and 7B, a tip dress and secondary circuit analysis may assist the manufacturer in understanding the source of a welding problem. The CFactor data in FIG. 7A and the resistance data in FIG. 7B appear normal. Referring to FIG. 7C, a current/resistance v. time graph for a failing weld assists an associate in locating a possible problem source. Resistance data for two welds prior to the cold weld (FIGS. 7D and 7E) and two welds after the cold weld (FIGS. 7F and 7G) further the investigation of the failure. FIGS. 7H and 7I comprise data for the beginning of the welds. The weld shown in FIG. 7H has a distinct discontinuity that is likely to have caused the problem (in relation to the weld shown for FIG. 7I). Because the weld points before and after on the same body as well as the same weld points before or after on the other bodies were good, the discontinuity relates to the likely culprit. A welding engineer and a maintenance associate may examine the defect body and the equipment to try to determine the root cause.

Figure 8A:
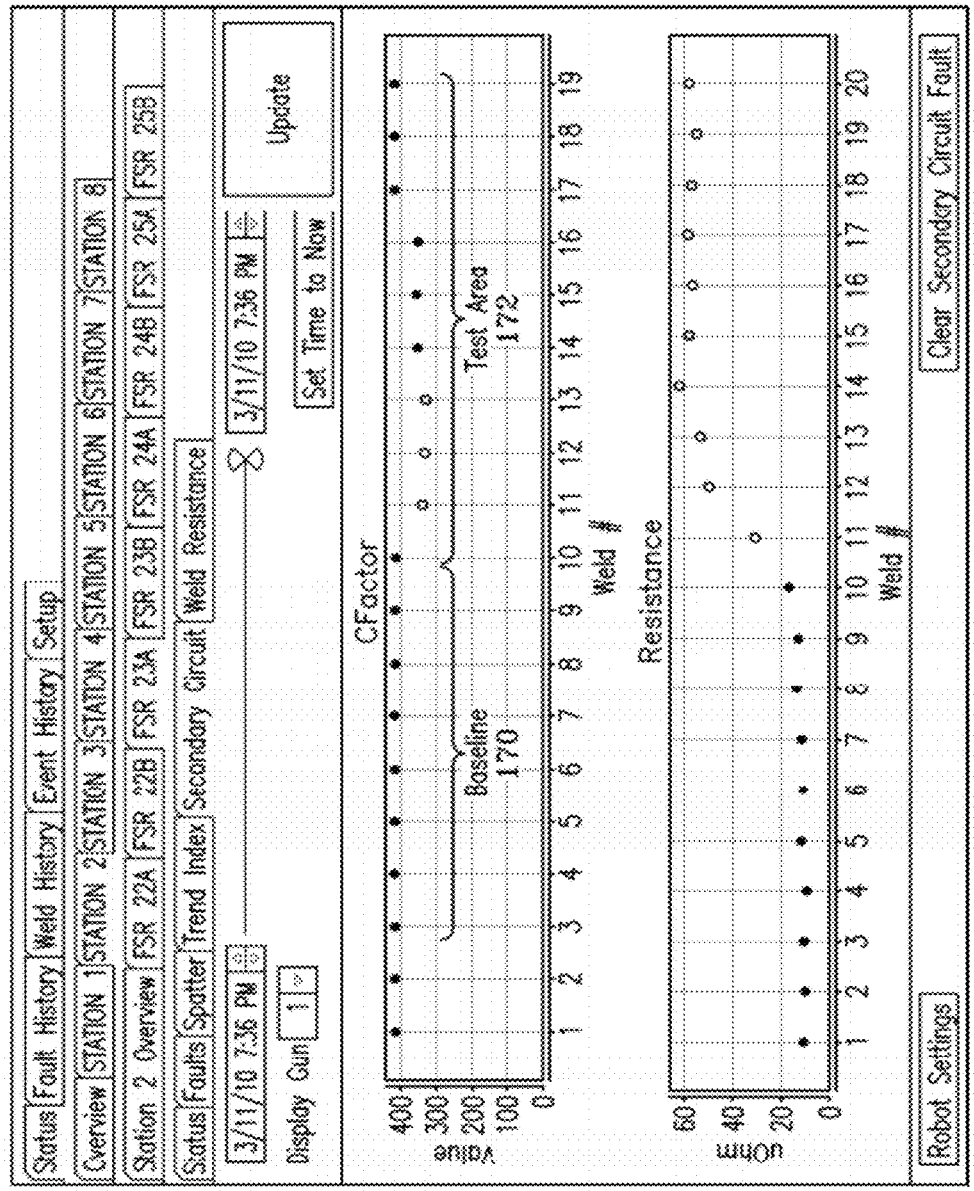
FIGS. 8A and 8B are sample secondary circuit analysis screens according to an example embodiment.
Figure 8B:
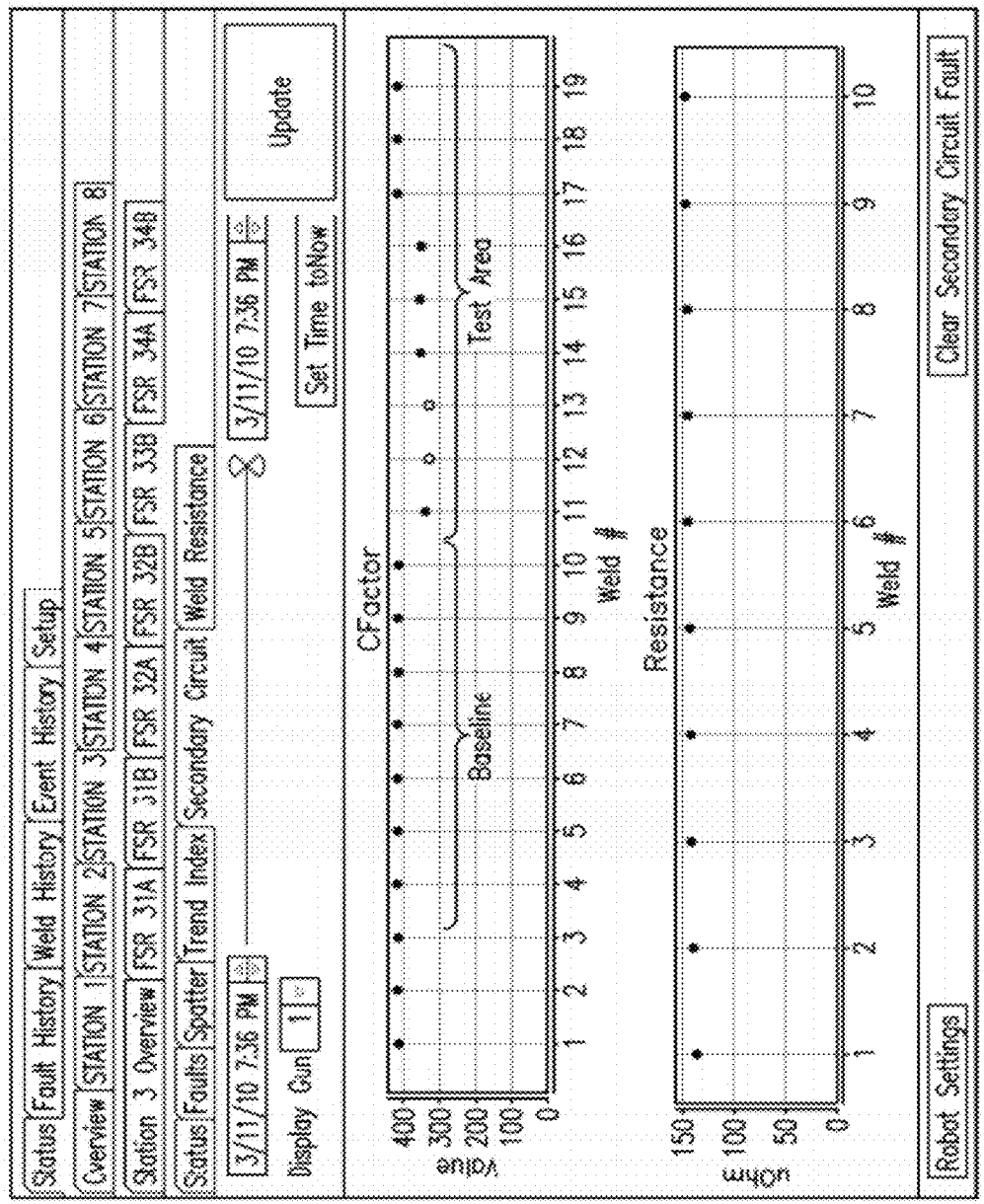

Referring to FIGS. 8A and 8B, sample screens for a secondary circuit analysis are shown. Collection and analysis of trend index data supports secondary circuit analysis by allowing a welding engineer or maintenance associate to analyze trend data related to tip dress checks. During production, welds may conform to pre-set tolerances but still degrade over time. Data collected during production may be compared in relation to baseline data to detect tip dress problems. For example, degradation in CFactor data between a baseline 170 and test 172 as shown in FIG. 8A may indicate a failing tip dress. Resistance data variations between a baseline and production run may also indicate a failing tip dress. The trend index shows the rate of change as measured in tip resistance and therefore, may be used to detect anomalies.

Figure 9A:
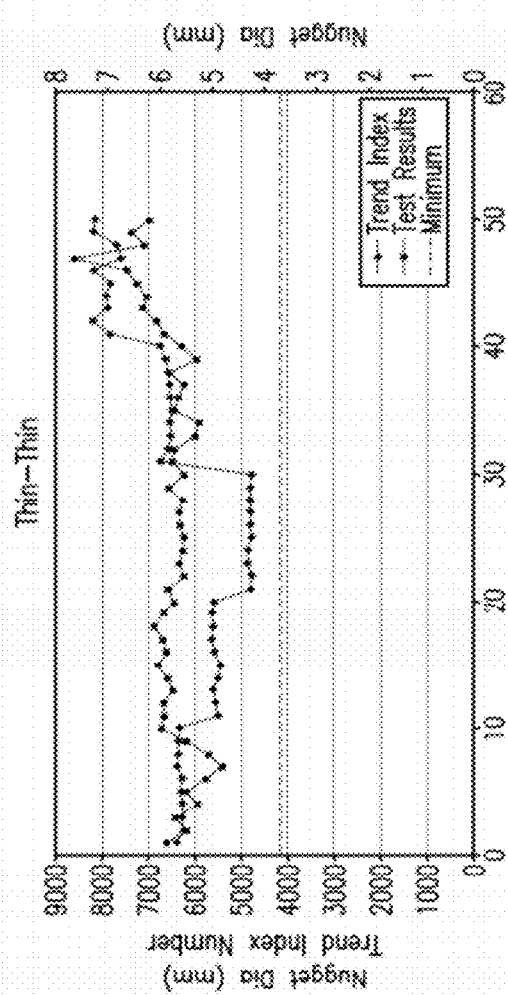
Figure 9B:
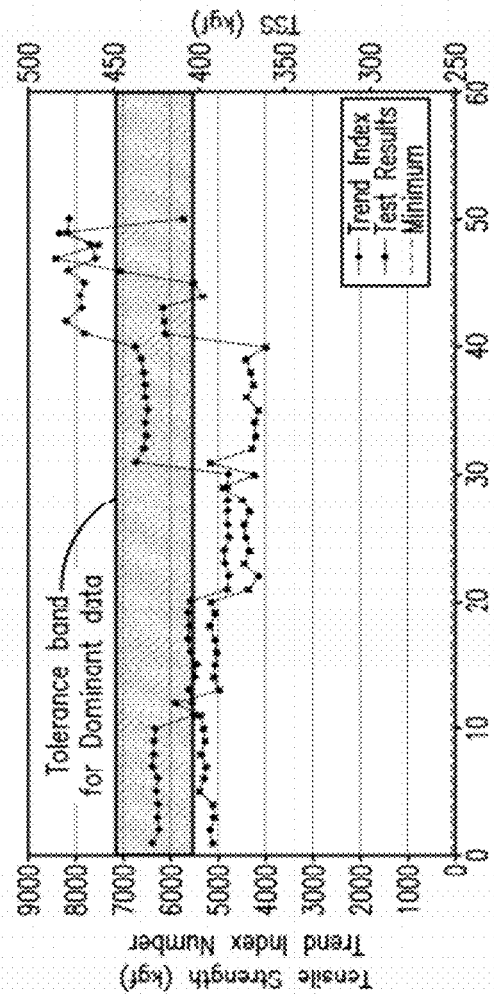
Figure 10A:
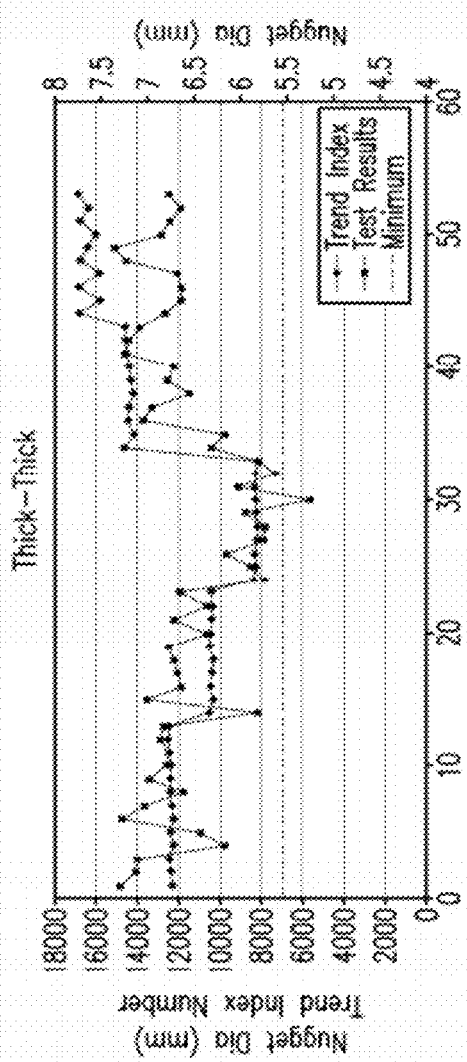
Figure 10B:
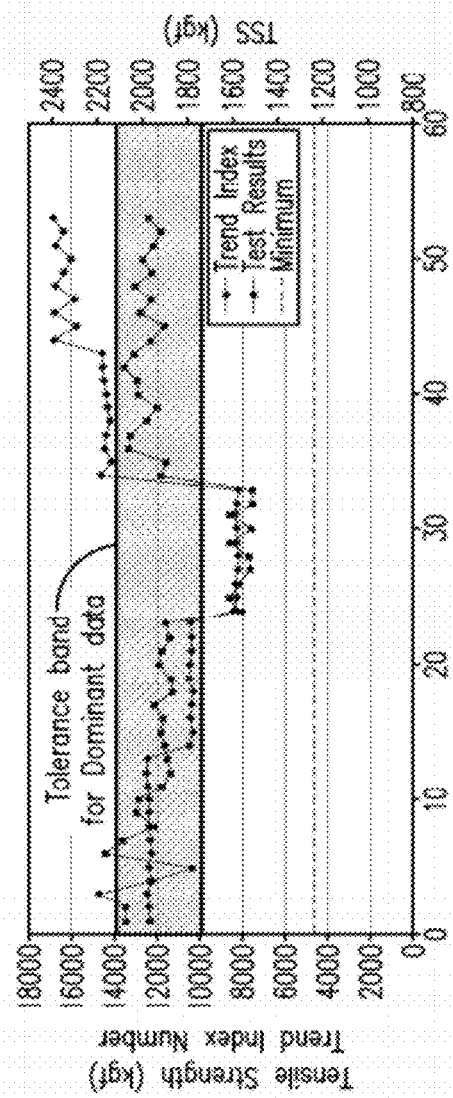
Figure 11C:
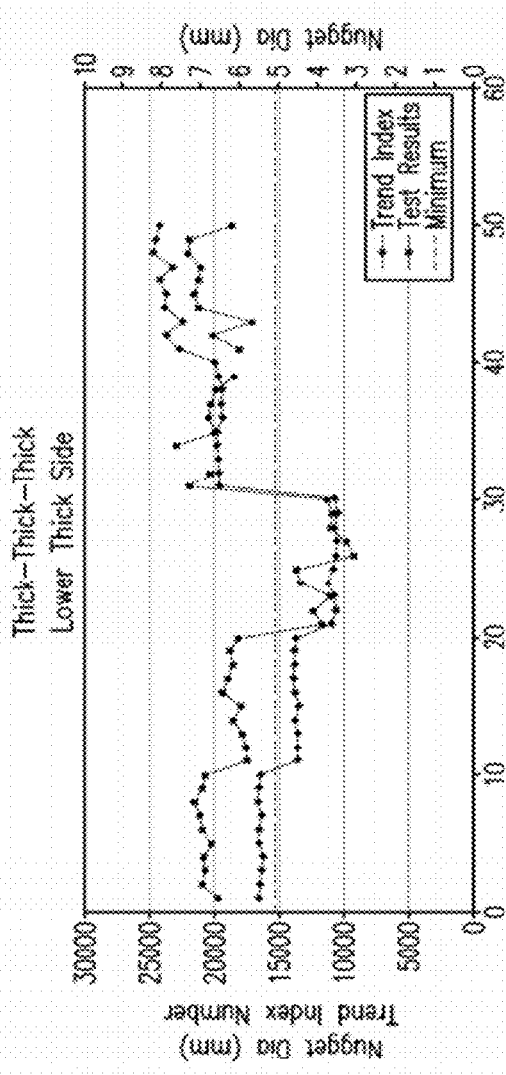
Figure 11D:
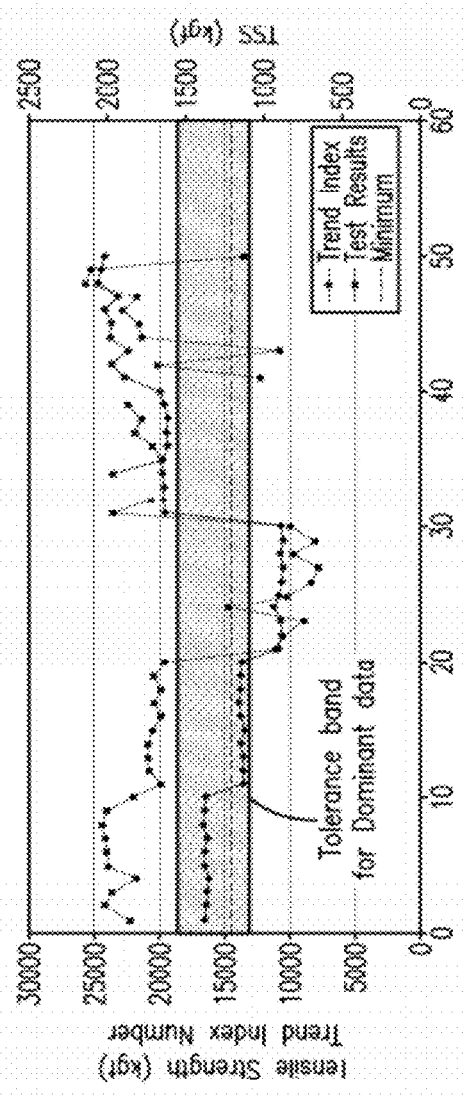

Referring to FIGS. 9A-9B, 10A-10B, 11A-11B, and 12A-12B, sample graphs for analyzing tolerances based on weld types is shown. Trend index data for each type of weld may be analyzed to determine appropriate minimum and maximum tolerances. Tolerances for different weld types may be established in the computerized system such that warnings or alerts are issued when trend index values exceed an established tolerance. FIGS. 9A-9B depict data for a thin-thin weld. FIGS. 10A-10B depict data for a thick-thick weld. FIGS. 11A-11D depict data for a thick-thick-thick weld. FIGS. 12A-12D depict data for a thick-thick-thin weld.

A computerized spot weld data management and monitoring system and method is described in reference to the appended figures. The description with reference to figures is made to exemplify the disclosed computerized spot weld data management and monitoring system and method and is not intended to limit the system and method or the features and functionality to the representations in the figures. From the foregoing description, it can be understood that there are various ways to construct a spot weld data management and monitoring system and method while still falling within the scope of the present invention. As such, while certain embodiments of the present invention are described in detail above, the scope of the invention is not to be considered limited by such disclosure, and modifications are possible without departing from the spirit of the invention as evidenced by the following claims:

What is claimed is:

1. A computerized spot weld data management system comprising:
   (a) a database storing for each of plurality of model identifiers and weld point identifiers spot weld point data for a plurality of weld operations, said weld point data collected during weld operations and comprising for each weld operation:
      (1) a current value;
      (2) a resistance value;
      (3) a weld time representing duration of said weld operation; and
      (4) a collection timestamp said current value, said resistance value, and said weld time are collected;
   (b) a computer with programming instructions that:
      (1) for each of said plurality of weld operations:
         (i) retrieves from said database said weld point data;
         (ii) applies a trend index equation to said current value, said resistance value, and said weld time to calculate a trend index value for said weld operation;
      (2) receives user selections of:
         (i) one of said plurality of model identifiers;
         (ii) one of said plurality of weld point identifiers; and
         (iii) a time period; and
      (3) generates a display comprising for:
         (i) said one of said plurality of model identifiers;
         (ii) said one of said plurality weld point identifiers; and
         (iii) said time period
            a plurality of collection timestamps a plot of trend index values for said plurality of weld operations.

2. The computerized system of claim 1 wherein said trend index value is calculated from a heat input value, said current value, said resistance value, and said weld time for said weld operation and a coefficient for a weld type.

3. The computerized system of claim 2 wherein said weld type is selected from the group consisting of thin/thin weld, thick/thick weld, thick/thick/thick weld, and thick/thick/thin weld.

4. The computerized system of claim 1 wherein said computer further generates a display comprising a baseline trend index of said weld point data for said plurality of weld operations.

5. The computerized system of claim 1 wherein said computer further generates a display comprising minimum and maximum tolerance indicators for said trend index values.

6. The computerized system of claim 5 wherein said computer further generates an alert if a trend index value exceeds a specified tolerance.

7. A computerized spot weld data management method comprising:
   (a) storing in a database for each of a plurality of model identifiers and weld point identifiers spot weld point data for a plurality of weld operations, said weld point data collected during weld operations and comprising for each weld operation:
      (1) a current value;
      (2) a resistance value;
      (3) a weld time representing duration of said weld operation; and
      (4) a collection timestamp said current value, said resistance value, and said weld time are collected;
   (b) receiving at a computer from said database said weld point data for each of said plurality of weld operations;
   (c) for each of said plurality of weld operations, applying at said computer a trend index equation to said current value, said resistance value, and said weld time to calculate a trend index value;
   (d) receives user selections of:
      (i) one of said plurality of model identifiers;
      (ii) one of said plurality of weld point identifiers; and
      (iii) a time period; and
   (e) generating at said computer for:
      (i) said one of said plurality of model identifiers;
      (ii) said one of said plurality of weld point identifiers; and
      (iii) said time period
         a display comprising a plot of trend index values for a plurality of collection timestamps.

8. The computerized method of claim 7 wherein said computer applying said trend index equation comprises applying said trend index equation to a heat input value, said current value, said resistance value, and said weld time for said weld operation and a coefficient for a weld type.

9. The computerized method of claim 8 wherein said weld type is selected from the group consisting of thin/thin weld, thick/thick weld, thick/thick/thick weld, and thick/thick/thin weld.

10. The computerized method of claim 7 further comprising the step of generating a display comprising a baseline trend index of said weld point data for said plurality of weld operations.

11. The computerized method of claim 7 further comprising the step of generating a display comprising minimum and maximum tolerance indicators for said trend index values.

12. The computerized method of claim 11 further comprising the step of generating an alert if a trend index value exceeds a specified tolerance.

13. A computerized method for displaying spot weld data comprising:
   (a) configuring a database for each of a plurality of model identifiers and, weld point identifiers to store spot weld point data for a plurality of weld operations, said weld point data collected during weld operations and comprising for each weld operation:
- (1) a current value;
- (2) a resistance value; and
- (3) a weld time representing duration of said weld operation;

(b) receiving at a computer from said database weld point data for each of a plurality of baseline weld operations;

(c) calculating at said computer a baseline trend index value for each of said plurality of baseline weld operations by applying a trend index equation to said current value, said resistance value, and said weld time for said weld operation;

(d) receiving at said computer from said database weld point data for each of a plurality of test weld operations;

(e) calculating at said computer a test trend index value for each of said plurality of test weld operations by applying a trend index equation to said current value, said resistance value, and said weld time for said weld operation;

(f) receiving at said computer user selections of:
- (1) a model identifier;
- (2) a weld point identifier; and
- (3) a time period; and (g) generating at said computer a display comprising for said selected model identifier, said selected weld point identifier, and said selected time period a plot of said baseline trend index values and said test trend index values.

14. The computerized method of claim 13 wherein:
storing in said database spot weld point data further comprises storing:
- (4) a heat input value; and
- (5) a coefficient for a weld type; and
calculating said baseline trend index value or said test trend index value comprises calculating said baseline trend index value or said test trend index value from said heat input value, said current value, said resistance value, and said weld time for said weld operation and said coefficient for a weld type.

15. The computerized method of claim 14 wherein said weld type is selected from the group consisting of thin/thin weld, thick/thick weld, thick/thick/thick weld, and thick/thick/thin weld.

16. The computerized method of claim 13 wherein said baseline trend index values are calculated using weld point data from a robot with dressed tips.

17. The computerized method of claim 16 wherein said test trend index values are calculated using weld point data from a robot operating at a low current.

18. The computerized method of claim 17 further comprising:
(h) calculating test trend index values from weld point data from a robot operating at a high current;
(i) measuring impedance to electrical flow for said test trend index values for said high current weld point data and said low current weld point data; and
(j) identifying measurements of impedance outside a specified range.

* * * * *